United States Patent [19]
Nishida et al.

[11] Patent Number: 5,220,540
[45] Date of Patent: Jun. 15, 1993

[54] DATA PROCESSING APPARATUS WITH SCHEDULE CREATION, PRIORITIZATION, DISPLAY AND CONTROL FUNCTIONS

[75] Inventors: Hiroshi Nishida, Tenri; Yutaka Nakamura; Makoto Kado, both of Yamatokoriyama; Fumihiro Inoue, Nara; Hiroshi Nakao, Nara; Masamitsu Takahashi, Nara; Junji Tanaka, Yamatokoriyama; Kouichi Tsubouchi, Nara; Hiroyuki Shigematsu, Yamatokoriyama, all of Japan

[73] Assignee: Sharp Kabushiki Kaisha, Osaka, Japan

[21] Appl. No.: 835,023

[22] Filed: Feb. 12, 1992

Related U.S. Application Data

[63] Continuation of Ser. No. 351,838, May 15, 1989, abandoned.

[30] Foreign Application Priority Data

May 17, 1988 [JP] Japan .................. 63-120165

[51] Int. Cl.⁵ .................. G04C 23/00; G06F 3/14
[52] U.S. Cl. .................. 368/41; 364/705.06; 364/DIG. 2; 364/918; 364/963.2
[58] Field of Search .................. 368/244, 251, 28, 41, 368/82; 364/DIG. 2, 710.01, 705.07

[56] References Cited

U.S. PATENT DOCUMENTS

| Re. 32,655 | 4/1988 | Levine | 368/29 |
|---|---|---|---|
| 4,070,697 | 1/1978 | Miller et al. | 360/12 |
| 4,276,541 | 6/1981 | Inoue et al. | 364/900 |
| 4,712,923 | 12/1987 | Martin | 358/29 |
| 4,715,010 | 12/1987 | Inoue et al. | 364/705 |
| 4,780,839 | 10/1988 | Hirayama | 368/82 |
| 4,866,611 | 9/1989 | Cree et al. | 364/900 |
| 4,896,306 | 1/1990 | Sanbongi et al. | 368/29 |

Primary Examiner—Eddie P. Chan
Attorney, Agent, or Firm—Cohen, Pontani, Lieberman, Pavane

[57] ABSTRACT

A data processing apparatus includes a key input device, a display device, a schedule data memory for storing schedule data attached with a data and a time within the date inputted from the key input device by the day, a time calculator for calculating a present date and time based on a date and time initially set, an alarm setting device for setting a requisition of alarm in a schedule data of a desired data and time included in the schedule data stored in the schedule data memory, a comparator for comparing the present date and time outputted from the time calculator with the date and time attached to the schedule data set with the requisition of the alarm by the alarm setting device and a display controller for simultaneously displaying the schedule data set with the requisition of the alarm and other schedule data being adjacent to said schedule data when the result of the comparison by the comparator is conformable.

2 Claims, 22 Drawing Sheets

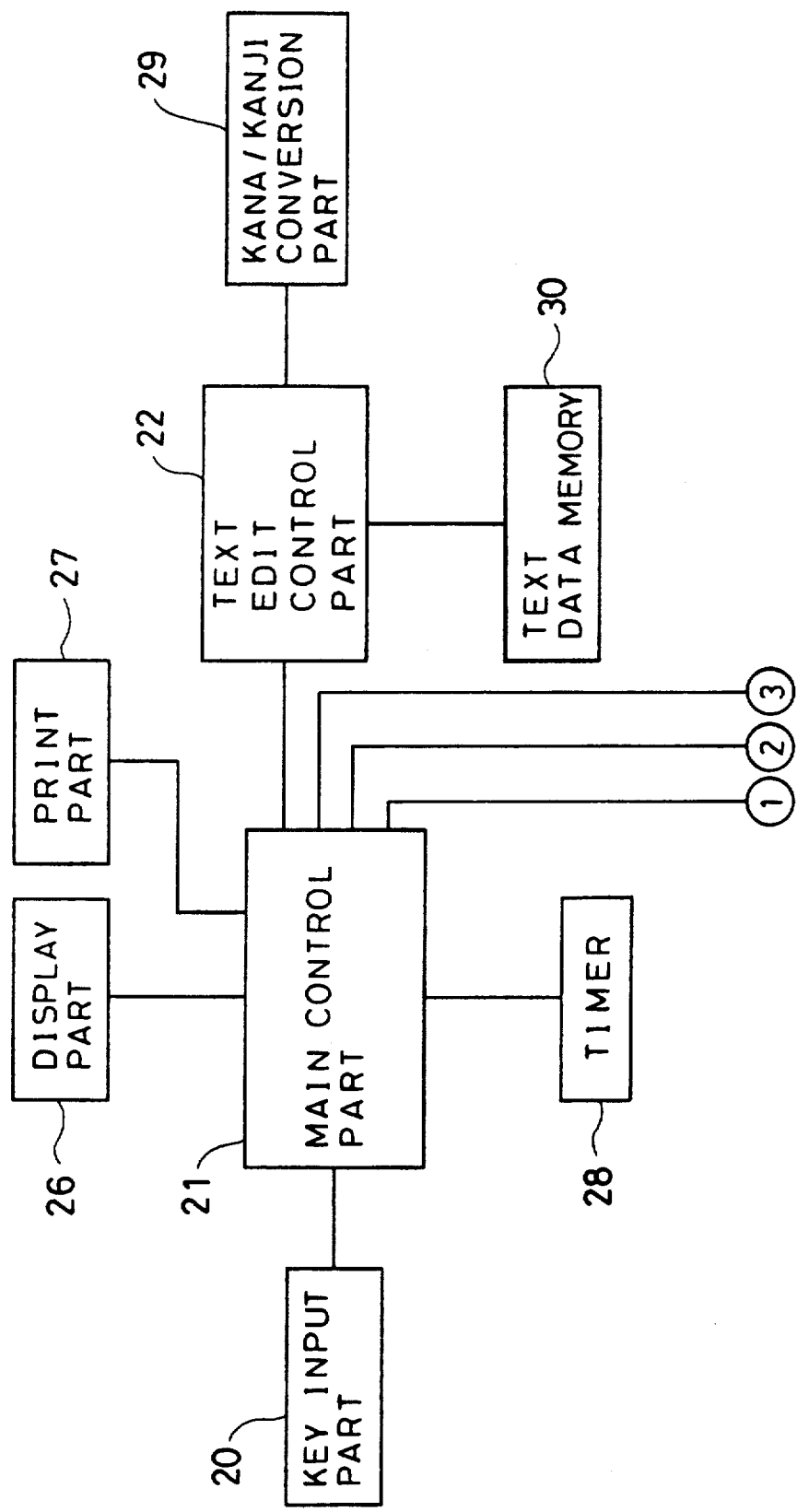

FIG. 2

TODAY'S SCHEDULE
10:00 ? Promotion meeting (RoomNo. 403)
13:00 Planning meeting (RoomNo. 303)
15:00 Mr. Yoshida visits
      Arrangements for New Year's Party
      (Kokusai Hotel)

MEMO
Phone Mr. Yoshida (06-123-1111)
Be sure to return video!

Select each function by
[DOCUMENTATION][SCHEDULE][ADDRESS] keys
⟨INITIAL DISPLAY SCREEN⟩
Special function effective

| F1 | F2 | F3 | F4 | F5 | F6 | F7 | F8 | F9 |
|----|----|----|----|----|----|----|----|----|
|    |    |    | Alarm | Time |  |  |  | Jan.11.1988 9:10 |

Kana Half-square

FEB 1988
S M T W T F S
      1 2 3 4 5 6
7 8 9 10 11 12 13
14 15 16 17 18 19 20
21 22 23 24 25 26 27
28

SECOND FORMAT

| DEC 1987 | JAN 1988 | FEB 1988 |
|---|---|---|
| S M T W T F S | S M T W T F S | S M T W T F S |
| 1 2 3 4 5 | 1 2 | 1 2 3 4 5 6 |
| 6 7 8 9 10 11 12 | 3 4 5 6 7 8: 9 | 7 8 9 10 11 12 13 |
| 13 14 15 16 17 18 19 | 10 11: 12· 13· 14. 15. 16 | 14 15 16 17 18 19 20 |
| 20 21 22 23 24 25 26 | 17 18 19 20 21 22 23 | 21 22 23 24 25 26 27 |
| 27 28 29 30 31 | 24 25 26 27 28 29 30 | 28 |
|  | 31 |  |

A

JAN 1988

| 8(F) | 10:00? ○ Promotion meeting (Room No. 403) |
|---|---|
|  | 13:00   Planning meeting (Room No. 303) |
|  | Arrangements for New Year's Party (Kokusai Hotel) 3 4 5 6 7 8 9 20 1 2 3 4 5 |
| 9(S) |  |
| 10(S) |  |
| 11(M) | 9:00 ✉ Prearrangement with Mr. Takada |
|  | 12:00   Lunching with Mr. Tanaka |
|  | 14:00   Liaison conference (Room No. 202) |

〈SCHEDULE〉
Function 2: Can be entered by F1 key

| F1 | F2 | F3 | F4 | F5 | F6 | F7 | F8 | F9 | | |
|---|---|---|---|---|---|---|---|---|---|---|
| Entry | Modifi-cation | Remark | Re-trieval | Date | Event | Switch-ing | List | Display change | | |

Romaji Kana  Half-square
Jan. 11. 1988    9 00
Erase

FIG. 4   THIRD FORMAT

| JAN 1988 | | |
|---|---|---|
| 31(T) | 17:25 | Evening meeting |
| 1(F) | | |
| 2(S) | | |
| 3(S) | | |
| 4(M) | | |
| 5(T) | 11:35 | Go to Tokyo (HIKARI 240) |
| 6(W) | 9:30 | Report on US market |
| | 12:00 | Lunching with Mr. Yoshida |
| 7(T) | 10:00 | Strategy meeting (Room No. 204) |
| 8(F) | 10:00 | ○Promotion meeting (Room No. 403) |
| | 13:00 | Planning meeting (Room No. 303) |
| | | Arrangements for New Year's Party (Kokusai Hotel) |
| 9(S) | | |
| 10(S) | | |
| 11(M) | 9:00 | Prearrangement with Mr. Takada |
| | ▲12:00 | Lunching with Mr. Tanaka |
| | 14:00 | Liaison conference (Room No. 202) |

《SCHEDULE》
Function 2: Can be inputted by F1 Key

| F1 | F2 | F3 | F4 | F5 | F6 | F7 | F8 | F9 | | |
|---|---|---|---|---|---|---|---|---|---|---|
| Entry | Modi-fication | Re-mark | Re-trieval | Date | Event | Switch-ing | List | Dis-play change | Jan.11,1988 Kana Half-square 9:10 | Erase |

FIG. 5    FOURTH FORMAT

SCHEDULE FOR JAN 1988

| | |
|---|---|
| 1(F) | 16(S) |
| 2(S) ⁰⁹○Prearrangement ¹²Lunching ¹³Word ¹⁷Depart | 17(S) |
| 3(S) ¹³□Liaison ¹⁴Idea ⁰⁹Morning (403 ¹¹Group* | 18(M) |
| 4(M) ¹⁰Liaison conference ¹⁴ Idea | 19(T) |
| 5(T) | 20(W) |
| 6(W) ¹⁴? ¹⁷? | 21(T) |
| 7(T) | 22(F) |
| 8(F) | 23(S) |
| 9(S) | 24(S) |
| 10(S) | 25(M) |
| 11(M) | 26(T) |
| 12(T) | 27(M) |
| 13(W) | 28(T) |
| 14(T) | 29(F) |
| 15(F) | 30(S) |
| | 31(S) |

⟨SCHEDULE⟩
Ending to shift to date with cursor         *Including other schedule

| F1 | F2 | F3 | F4 | F5 | F6 | F7 | F8 | F9 | | | |
|---|---|---|---|---|---|---|---|---|---|---|---|
| Preced-ing day | Follow-ing day | | | | End | Preced-ing month | Follow-ing month | Jan. 11. 1988 | Kana | Half-square | 9:10 |

FIG. 6

FIFTH FORMAT

Month. Day.      Month. Day.

▲ Jan. 8 Founding anniversary
Mar. 15 Closing fiscal year accounts

《EVENT SETTING》
Select operation by selecter key

| F1 | F2 | F3 | F4 | F5 | F6 | F7 | F8 | F9 | |
|---|---|---|---|---|---|---|---|---|---|
| Addi-tion | Modi-fica-tion | | | | End | | | Jan. 11. 1988 | Kana Half-square 9:10 Erase |

FIG. 9

```
Jan. 1st, 1988    15:30.00
      <<< Alarm >>>
15:30    Planning meeting at the Head office
         No.1 Meeting Room (After one hour and half)
17:00    Evaluation of the new products in the testing room
         of the commodities.
         No.2 Testing Room
```

FIG. 10

```
        DEC 1987              JAN 1988              FEB 1988
   S  M  T  W  T  F  S    S  M  T  W  T  F  S    S  M  T  W  T  F  S
         1  2  3  4  5                   1  2       1  2  3  4  5  6
   6  7  8  9 10 11 12    3  4  5  6  7  8  9    7  8  9 10 11 12 13
  13 14 15 16 17 18 19   10 11 12 13 14 15 16   14 15 16 17 18 19 20
  20 21 22 23 24 25 26   17 18 19 20 21 22 23   21 22 23 24 25 26 27
  27 28 29 30 31         24 25 26 27 28 29 30   28
                         31
```

JAN 1988

| | | |
|---|---|---|
| 8th(Fri) | 10:00 ◎ | |
| | 13:00 | |

═══ Alarm ═══
⊗【12:30】
? ⊗ Promotion meeting (Meeting Room)
   Be sure and to bring the documents!
   May 2nd, 1988  18:00 ⇨
   ⇧ Depart for Hawaii

| 9th(Sat) | · · · · · · · |
| 10th(Sun) | · · · · · |
| 11th(Mon) | · · · |
| 12th(Tue) | |

《Scheduler》 Function 2: Can be inputted by "F2" Key.

| F1 | F2 | F3 | F4 | F5 | F6 | F7 | F8 | F9 |
|---|---|---|---|---|---|---|---|---|
| Change | Expression making | Non-registration Characters | | | | | Move | Copy |

FIG.12

Name:
Hiroaki Ito
Kenji Uenishi
Koichi Okura
Yasunori Okubo
■

<Schedule>
Jan. 8th, 1988 10:00  Promotion meeting
<Memo>
• Phone to Mr. Oda (Phone No. 123-456)
• Bring the materials
• Wait for Mr. Watanabe (at Hibiya).

《Interruption》 A4  35       7.0mm Write  Bottom Ornamen-  Japanese Page 1  34 lines  About 80,000
       Longitu- Char-            in        tal-1      text                remained  characters
       dinal    acters           lateral Ordinary                         remained
                                 lines.

| F1 | F2 | F3 | F4 | F5 | F6 | F7 | F8 | F9 | Kana Half-square Jan. 6th, 1988 9:10 |

Release

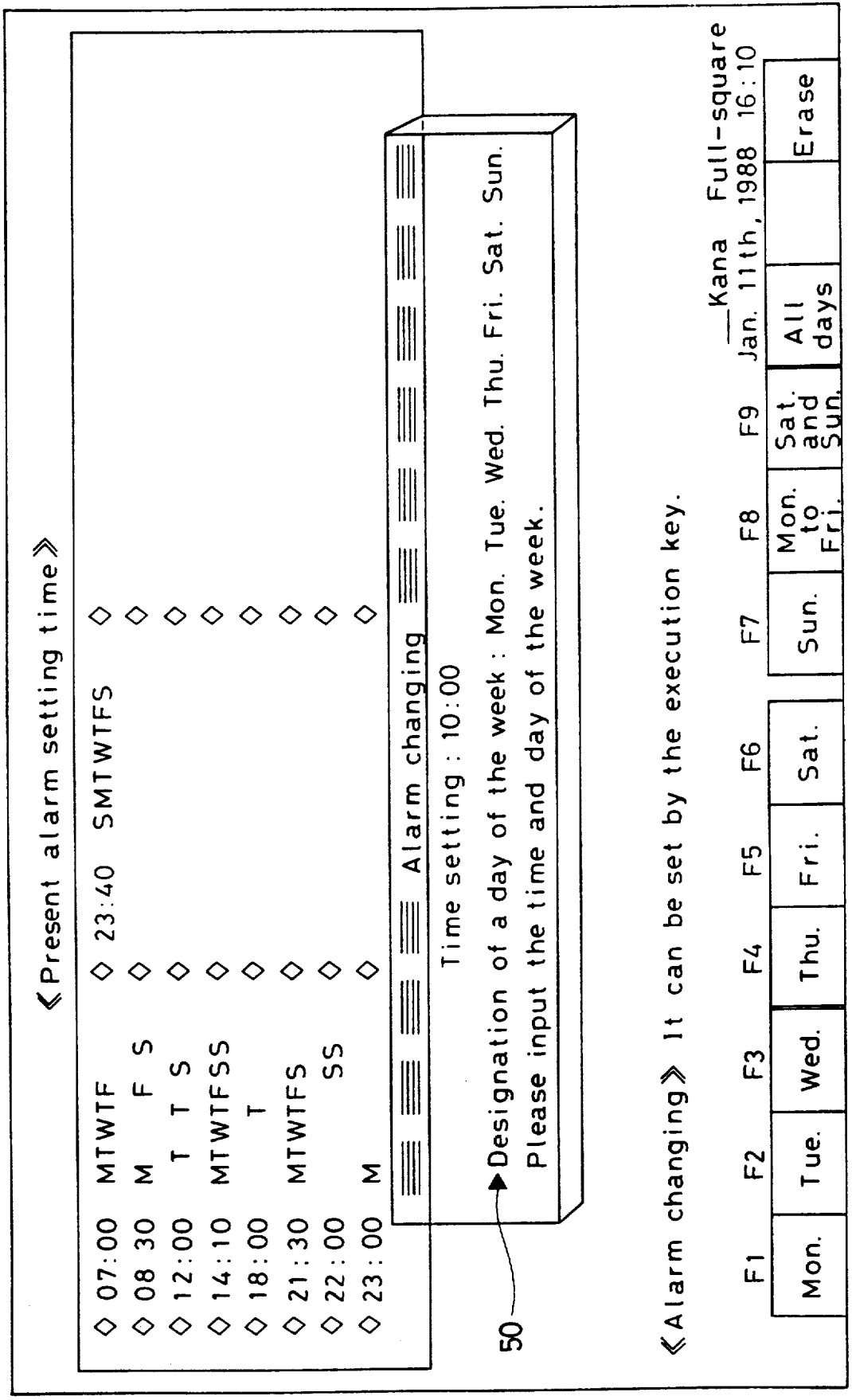

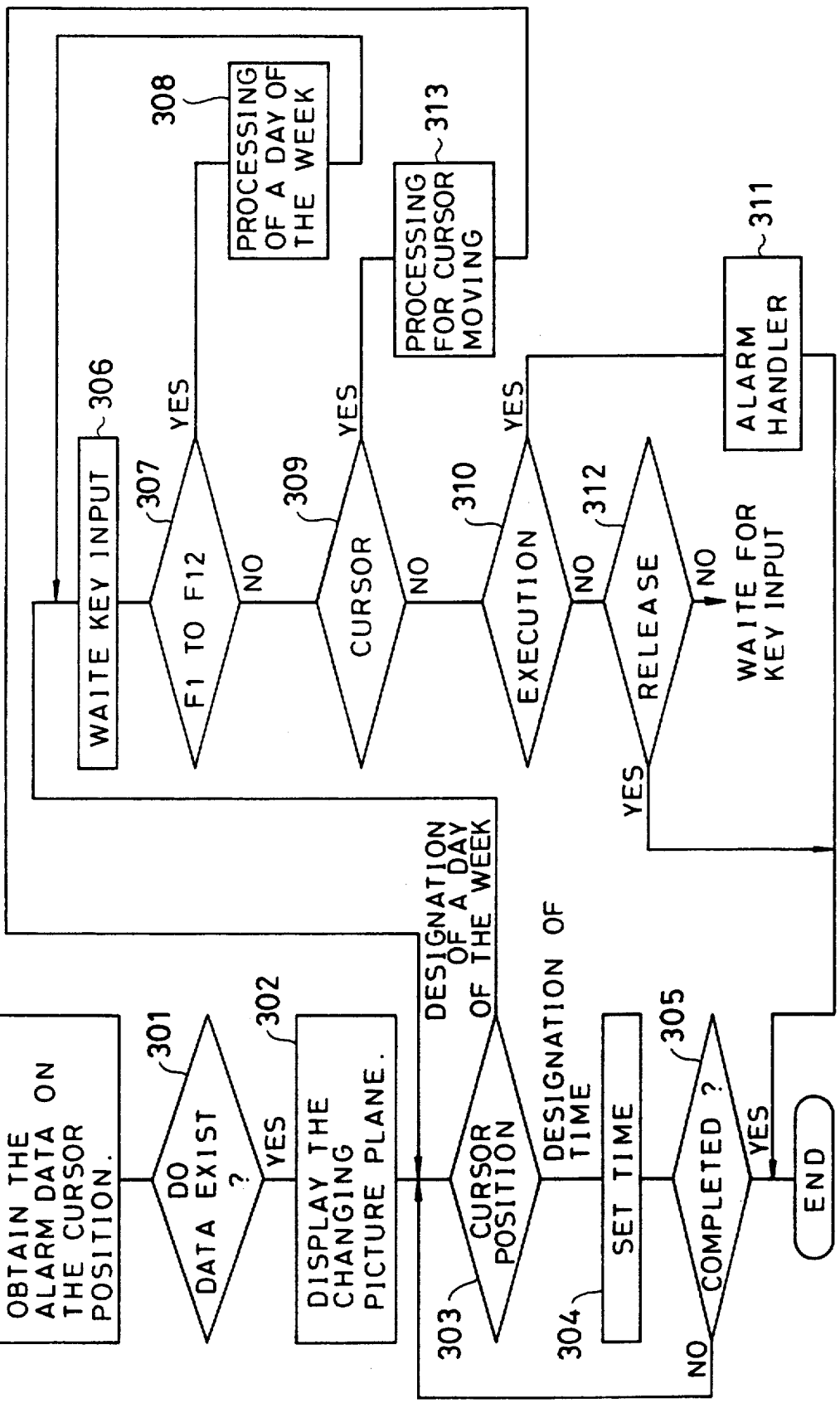

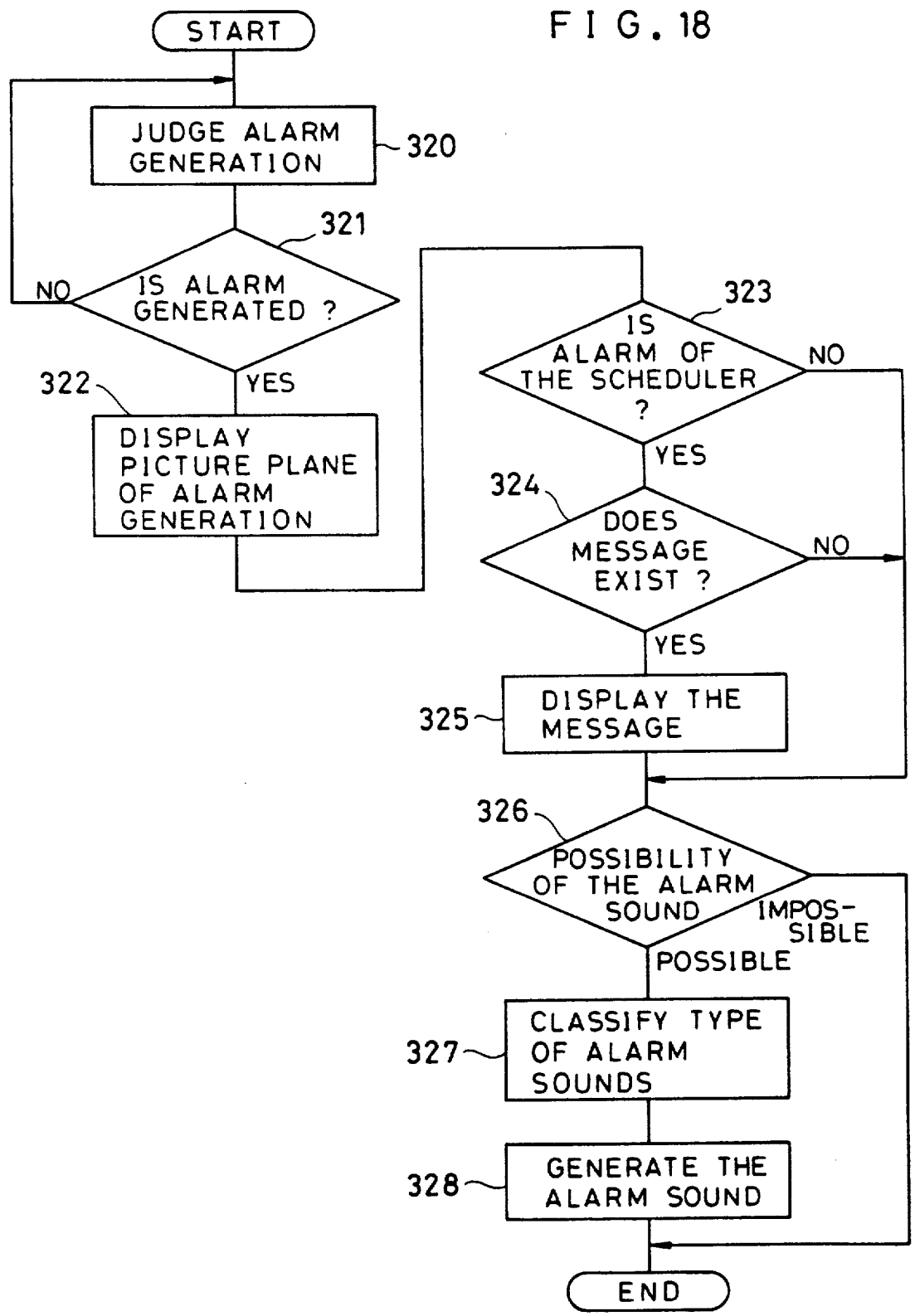

DATA PROCESSING APPARATUS WITH SCHEDULE CREATION, PRIORITIZATION, DISPLAY AND CONTROL FUNCTIONS

This is a continuation of U.S. spplication Ser. No. 07/351,838, filed May 15, 1989, now abandoned.

BACKGROUND OF THE INVENTION

1. Field of the Invention

The present invention relates to a data processing apparatus and, more particularly, to a data processing apparatus with schedule control function, wherein a schedule of meetings, arrangements and other types of events can be stored in a memory at every date, specified when necessary, allowing display of a particular schedule to be stored on specified dates.

2. Description of the Prior Art

Normally, this kind of data processing apparatus includes a word processor with a schedule control function added to a character processing function, an office computer with a schedule control function added to the data processing function, or an electronic pocketbook provided only with a schedule control function and the like.

The schedule control function refers to that in which schedule data is inputted in a predetermined format and is stored according to the predetermined method (such as, for example, date order, time order or the like), including conditions such as the date and others that may be further specified, allowing a visual output of desired schedule data. Thus, the schedule data refers basically to a date, a time and a content entered at specific times, and the content may include, for example, meetings, arrangements and the like.

The construction wherein a plurality of future calendar appointments and events are stored in a memory at particular daily, weekly, or other date interval periods, and wherein for a selected time period these appointments and events are outputted to a display unit, has been disclosed in U.S. Pat. No. 4,162,610, titled "ELECTRONIC CALENDAR AND DIARY".

Also, there are data processing apparatuses having functions such as so called alarm functions which comprise a function for setting a buzzer sounding time included in schedules stored in the memory so that an operator is informed that the set time of the event has arrived, for example by sounding the buzzer, and another function for indicating only the set schedule at the same time that the buzzer sounds.

However, in the alarm function, only the schedule of the particular time set is displayed. Therefore, it is necessary to set the apparatus to the display mode in order to see the next scheduled event. Moreover, it has been inconvenient in that operators had to separately calculate the time difference between the two abovementioned schedules or events by other means such as by hand, calculator, etc.

Furthermore, where it is desirable to preliminarily annunciate the operator in advance of the set time, as for example, for an importantly scheduled time, it has been necessary to set the preliminary time approximately calculated by the operators themselves. Where the time is set in such a manner, it has been inconvenient to use the apparatus by having to set both the actual event time and the preliminarily informing time.

SUMMARY OF THE INVENTION

The present invention relates to a data processing apparatus with schedule control function which comprises:

key input means for inputting schedule data and various designations;

display means for displaying various data including the schedule data;

schedule data memory means for storing schedule data associated with a date and a time within the date inputted from the key input means by the day;

time calculation means for calculating a present date and time based on a date and time initially set;

alarm setting means for setting the ringing of at least one alarm in a schedule data of a desired date and time included in the schedule data stored in the schedule data memory means; and comparison means for comparing the present date and time outputted from the time calculation means with the date and time attached to the schedule data set with the requisition of the alarm by the alarm setting means.

Furthermore, the data processing apparatus with schedule control function of the present invention may provide the following construction A):

display control means for simultaneously displaying the schedule data set with the requisition of the alarm and other schedule data being adjacent to said schedule data when the result of the comparison by the comparison means is confirmation between the present data and time and the scheduled data and time.

According to the above construction A), in addition to displaying a schedule when its designated time arrives, one or a plurality of the next scheduled events of the aforesaid schedule can be displayed simultaneously.

Then, the data processing apparatus of the present invention may provide the following construction B):

second display control means for displaying the schedule data set with the requisition of the alarm on the display means with priority over all others regardless of a particular state of use during operation and displaying the schedule data set with ringing of an alarm after a power source is put on from an unused state, in accordance with the result of a comparison by the comparison means; and alarm means for annunciating that the schedule data set with the requisition of the alarm is displayed on the display means.

According to the construction B), a schedule set on a preliminary date and time corresponding to a demand or request by an operator can be displayed on the display means with priority over all others whether the power source is put on or off.

Also, the data processing apparatus with schedule control function of the present invention may provide the following construction C):

preliminary time setting means for calculating a preliminary alarm time in advance of a predetermined time attached in the schedule data set with the requisition of the alarm and setting the preliminary alarm time to the schedule data;

second comparison means for comparing the present time outputted by the time calculation means with the time set by the preliminary time setting means;

reason memory means for storing a reason for which the requisition of the alarm is set against the schedule data inputted from the key input means;

third display control means for displaying the schedule data set for the preliminary alarm time and the reason stored in the reason memory means corresponding to the schedule data on the display means at the same time in accordance with the result of a comparison by the second comparison means, and further displaying the schedule data set with requisition of the alarm and the reason on the display means at the same time in accordance with the result of the comparison by the comparison means; and second alarm means for annunciating that the schedule data set for the preliminary alarm time is displayed on the display means and annunciating that the schedule data set with the requisition of the alarm is displayed on the display means.

According to the construction C), not only the schedule which has been set with a date and time set in advance by an operator corresponding to the demand or request can be displayed and annunciated, but also a preliminary alarm can be annunciated at a predetermined time before the set time, the schedule and the reason why the preliminary alarm is annunciated are simultaneously displayed on the display.

In addition, the data processing apparatus of the present invention may contain at least one of the above constructions A) to C). Thus, the basic construction can be combined with the construction B) or combined with the above construction C) instead of the construction B).

BRIEF DESCRIPTION OF THE DRAWINGS

FIGS. 1a and 1b are block diagrams showing an embodiment of the present invention;

FIG. 2 is a diagram showing a configuration of an initial screen in an embodiment;

FIG. 3 is a diagram showing a configuration of a display screen in accordance with a Format A according to an embodiment;

FIG. 4 is a diagram showing a configuration of a display screen in accordance with a Format B according to an embodiment;

FIG. 5 is a diagram showing a configuration of a display screen in accordance with a Format C according to an embodiment;

FIG. 6 is a diagram showing a configuration of a display screen in accordance with a Format D according to an embodiment;

FIGS. 9 and 10 are diagrams respectively showing a display screen configuration according to the operation shown in FIGS. 8a and 8b;

FIG. 12 is a diagram showing a configuration of a display screen according to the operation shown in FIGS. 11a and 11b;

FIGS. 14 and 16 are respectively flowcharts showing an operation for setting the alarm for a particular day of the week;

FIG. 17 is a diagram showing an input configuration of a display screen for inputting a change to the day of the week in the alarm setting mode for day of the week;

FIG. 18 is a flowchart showing an operation for generating an alarm sound of a different tone.

DETAILED DESCRIPTION OF THE PREFERRED EMBODIMENTS

The data processing apparatus with schedule control function according to the present invention mainly comprises a keyboard for inputting schedule data and various designation, memory units such as random access memory and read only memory (RAM and ROM) for storing schedule data and programs, and a central controlling unit which includes a microprocessor, for processing various data.

The schedule data according to the present invention are basically composed of date, a time and contents entered at every time; alarm setting data (hereafter referred to as alarm data) for setting date and time to generate an alarm when arriving at the date and time entered in the contents; and preliminary alarm setting data (hereafter referred to as preliminary alarm data) for setting date and time obtained by calculating a time which is a predetermined time, for example several minutes, before the time when the alarm setting data is set and stored in the memory system at the unit of day. Moreover, the schedule data may include marks such as picture marks, etc. visually expressing the aforesaid contents and secret setting data for preventing the entered contents from perusal by other persons.

The data processing apparatus with schedule control functions according to the present invention is constructed so that the schedule data, the alarm data or preliminary alarm data which are set are displayed on a display unit or display screen based on the alarm data.

Figure 1B:
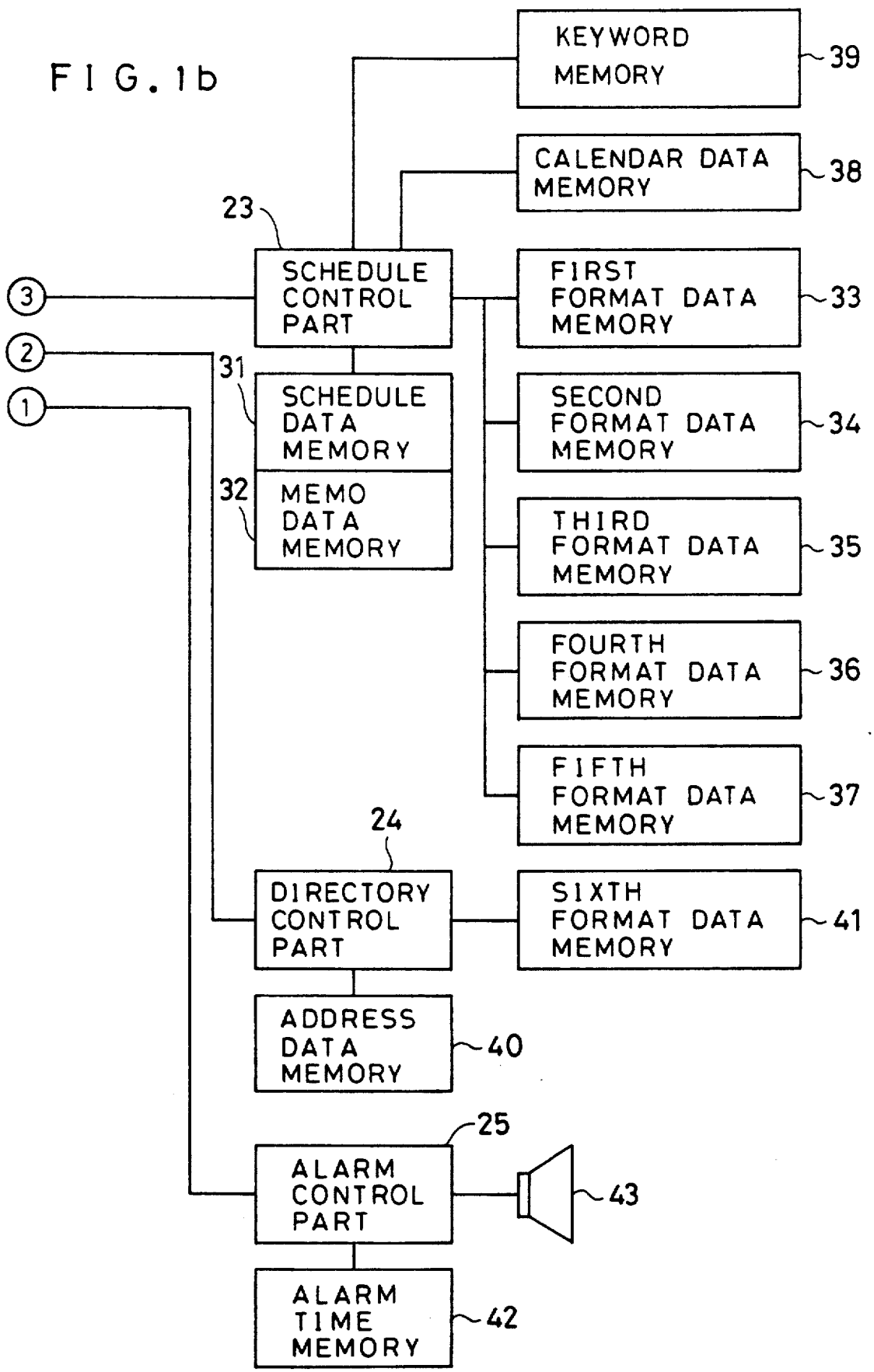

FIGS. 1a and 1b are block diagrams showing a construction of a data processing apparatus with schedule control function in a word processor designed for the Japanese language.

In FIGS. 1a and 1b, reference numeral 20 denotes a key input part having numerical keys, function keys, alphabet/kana keys and the like. The key input part 20 is connected to a main control part 21, and schedule data inputted from the key input part 20, a character string for kana/kanji conversion and various designations are provided to the main control part 21.

The main control part 21 controls the text edit control part 22, a schedule control part 23, a directory control part 24 and an alarm control part 25 according to various programs stored in ROM (not indicated) and incorporated therein, and also controls a display part 26, a print part 27 and a timer 28.

In order to control the kana/kanji conversion part 29 and a text data memory 30, the text edit control part 22 creates text according to data inputted from the key input part 20, and stores the created text in the text data memory 30.

The kana/kanji conversion part 29 is a unit for converting inputted kana data into corresponding kanji or kana, and any construction known in the relevant field may be employed. Text data memory 30 may be constructed, of, for example RAM, or may be constructed of RAM and an external memory using floppy disk or the like as storage mediums. The basic function of the Japanese word processor is carried out according to the aforementioned construction.

Main controlling of the schedule control is carried out by the schedule control part 23 so that respective data are stored in a schedule data memory 31, memo data memory 32, the first to fifth format data memories 33 to 37, calendar data memory 38 and keyword memory 39.

The memo data stored in the memo data memory 32 consists of additional information which cannot be entered in the contents of the schedule data and information which is inputted at the time of preliminary alarm data setting stating the reason for setting the preliminary alarm. An additional information is assigned to one particular data.

The first format data memory 33 stores an initial display screen format F which is displayed when the power is supplied initially, and as shown in FIG. 2, functions to display a schedule data of the day (today's), which is computed, by the timer 28, and includes a memo data of the day, and a calendar of the month to which the day pertains each on the same display screen.

The second format data memory 34 stores, as shown in FIG. 3, a display screen format A for displaying calendars for three complete months including the month and the day on which the power is supplied or a specified data, the preceding month and the following month thereto, and a schedule for several days including today's date or specified date each on the same display screen.

The third format data memory 35 stores, as shown in FIG. 4, a display screen format B consisting of the schedule from a certain starting date only.

The fourth format data memory 36 stores, as shown in FIG. 5, a display screen format C consisting of a schedule for the one month immediately preceding today's date.

The fifth format data memory 37 stores, as shown in FIG. 6, a display screen format D consisting of an annual schedule of predetermined events, anniversaries and others.

The calendar data memory 38 stores plural calendars formed in a table type by arranging days of one month according to seven days in a week provided by the schedule control part 23.

The keyword memory 39 stores a keyword inputted from the key input part 20, for example, a synonym which is a word having similar signification such as "parents" and "father and mother", or a title of a project and a name of person concerned.

Then, the directory control part 24 operates for controlling data on directory management, stores directory data such as full name, company name, phone number, address and others in an address data memory 40, reads the directory data and displays on a screen of the display part 26 in a predetermined display format stored as the sixth format data memory 41.

When an alarm data is set in the schedule data, the alarm control part 25 drives an alarm generator 43 which is activated when alarm time data stored in an alarm time memory 42 corresponds to a predetermined date.

The display part 26 is composed of, for example, CRT (Cathode-Ray Tube), LCD (Liquid Crystal Display), driving circuits and a displaying buffer temporarily for storing data to be displayed.

Printers widely known in the art such as heat transfer type, needle dot impact type printers or the like can be supplied as the print part 27. Print part 27 may be other than a Centronics-type interface for external printers.

The timer 28 computes the present date and time according to date and time data inputted from the key input part 20 at initialization, and outputs specific time information used for schedule management and alarm control to the schedule control part 23 through the main control part 21. The timer 28 is backed up by a battery so that it will operate even after power for the entire system is cut off. Furthermore, the timer 28 stores the alarm time nearest to the present time while using period sent from the alarm control part 25, and also compares point by point the present date and time with the stored alarm time data after the power source is cut off. In such a manner, when these times are equal, the alarm signal which engages the power source is outputted to a power source circuit which is not illustrated in the diagram.

The operation of an embodiment of the instant invention is shown in FIG. 7 to FIG. 18, in which the schedule data and memo data are assumed to be stored respectively in the schedule data memory 31 and memo data memory 32.

Figure 7:
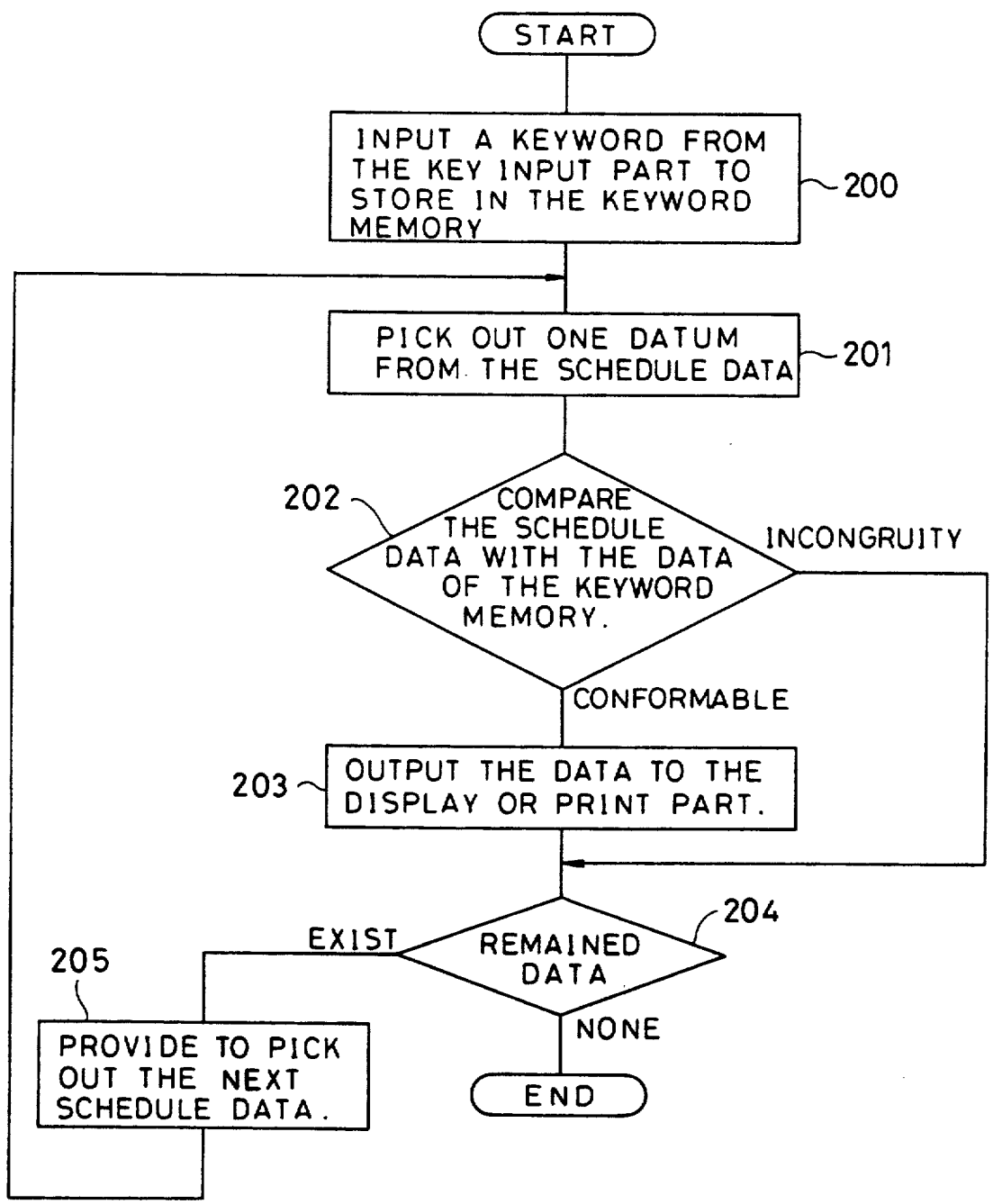
FIG. 7 is a flowchart showing a keyword retrieving operation of schedule data according to an embodiment.

In FIG. 7, when an operator first inputs a keyword from the key input part 20, the keyword is stored through the main control part 21 and the schedule control part 23 into the keyword memory 39 (Step 200). Then, the schedule data having the stored keyword is retrieved. In this retrieval of the schedule date, one schedule datum is first picked out from the schedule data memory 31 (Step 201) and the schedule datum is compared with the keyword memory stored in the keyword memory 39 (Step 202). If they are the same, the schedule data is outputted to the display part 26 or print part 27, which are output means (Step 203).

Then, the schedule control part 23 judges whether the remained data exist or not in the schedule data memory 31 (Step 204). If it exists, the next piece of data is provided to be picked out (Step 205) and the processing then returns to Step 201. Thereafter, the aforesaid Step 201 to Step 205 are repeatedly executed until the last of all the schedule data having the keyword are collectively displayed on the display part 26 or print part 27 so that they can be seen visually.

Accordingly, even if many kinds of different schedule data are inputted, only the schedule data mutually concerned can be displayed collectively by designating the keyword of a project title and a name of person concerned, for instance. Therefore, it becomes easy to display a schedule data list without complication and only a desired schedule data can be confirmed quickly.

The operation of the alarm will be explained as it is shown in FIGS. 8a and 8b to FIG. 18.

Figure 8A:
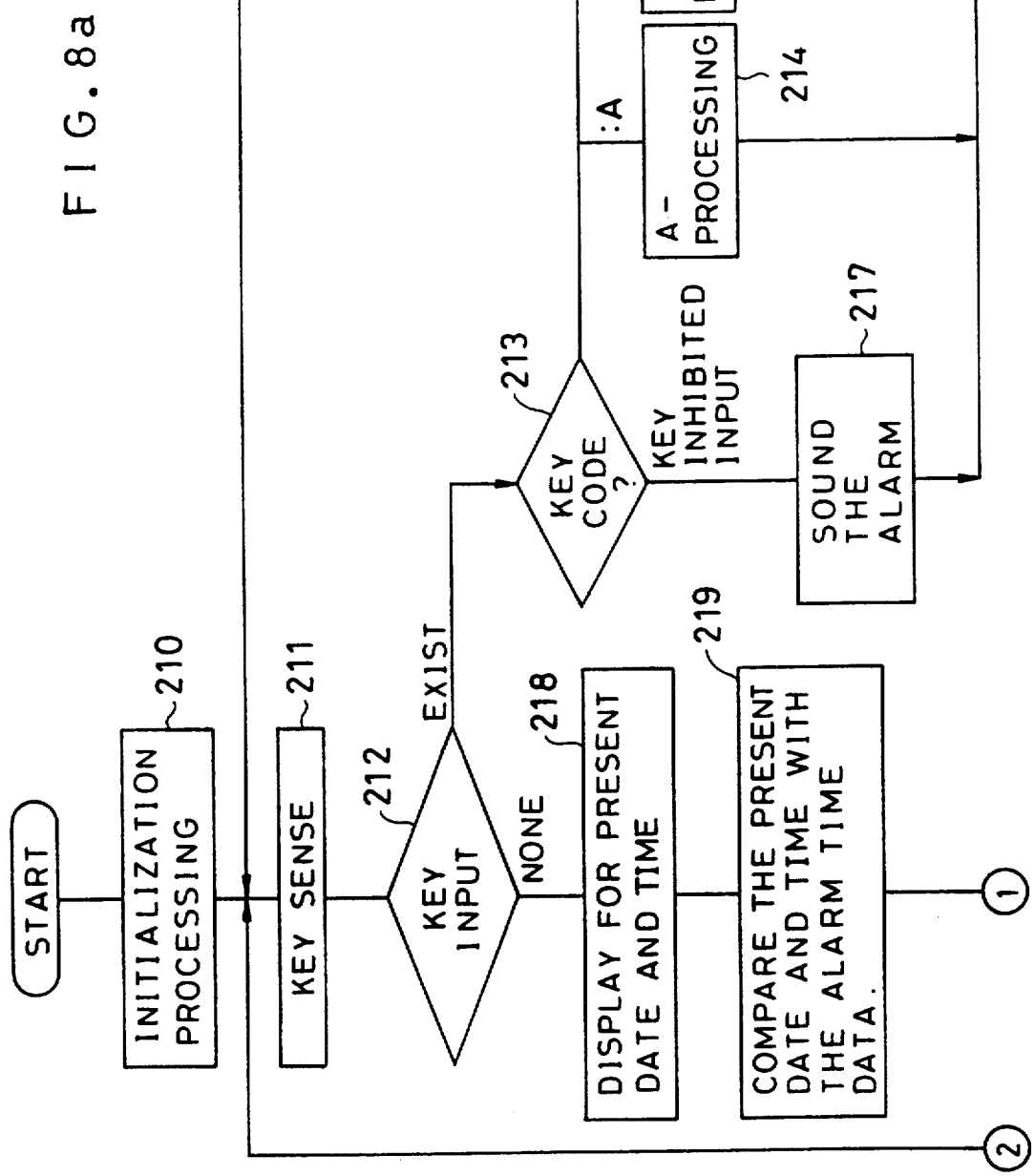
FIGS. 8a and 8b are flowcharts showing a simultaneous displaying operation of schedule data necessary to be annunciated and other schedule data close in date and time to the aforesaid schedule data according to an embodiment.
Figure 8B:
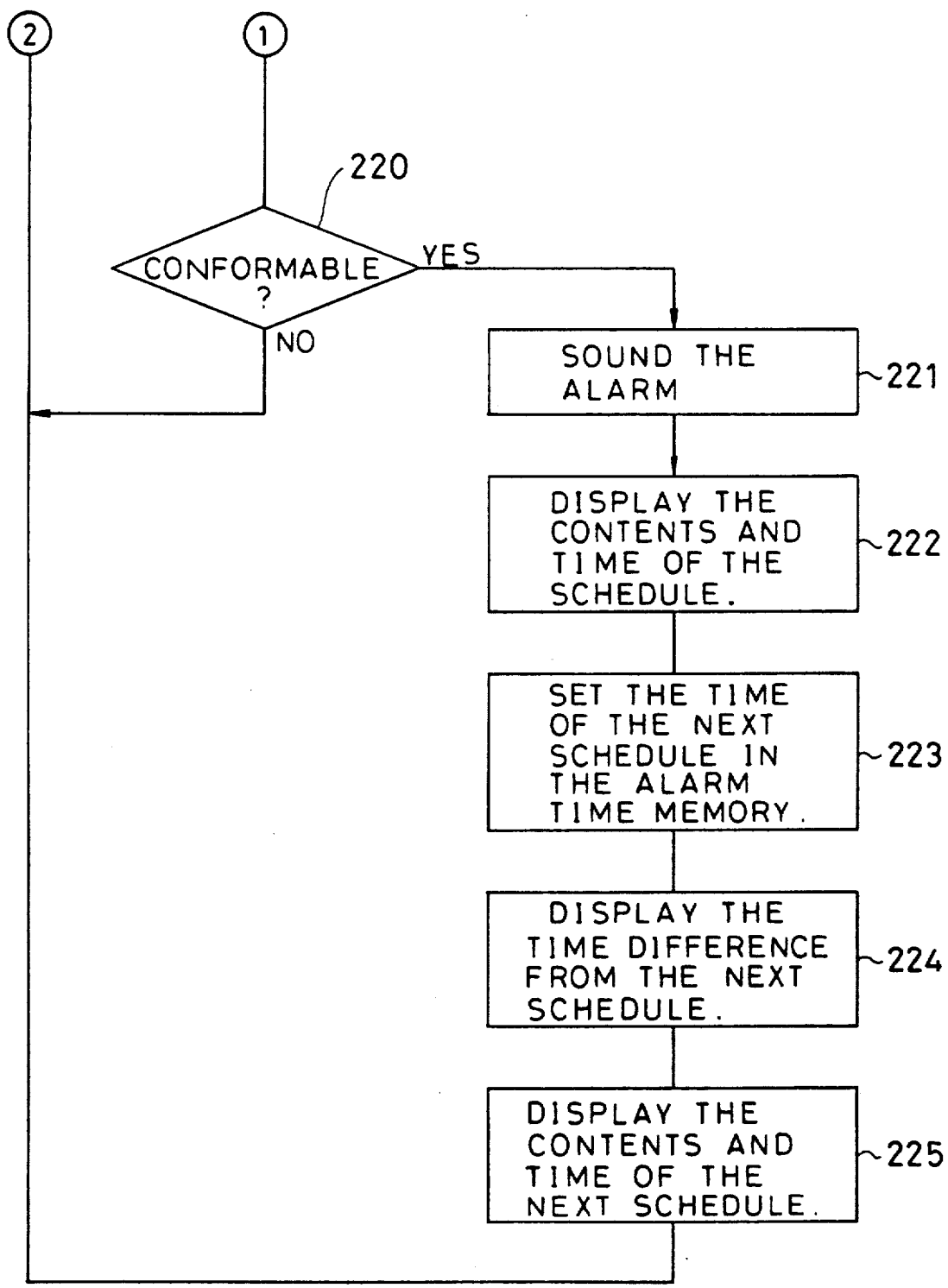

In FIGS. 8a and 8b, the initial conditions of each memory and the display part 26 and the like are first set by the initialization processing (Step 210). Thereafter, key sense is executed (Step 211) in order to judge whether any key is depressed on the key input part 20 or not (Step 212). If any key is depressed, the keycode of the depressed key is judged (Step 213), and then, processing occurs in correspondence with the keycodes such as schedule data inputting (A-processing), alarm setting (B-processing) and further schedule data registration (C-processing), executed respectively (Step 214, 215 and 216). If the keycode indicates that a key has an inhibited input, the operator will be informed by a buzzer sound that the input cannot be executed (Step 217). After each processing is executed, the key sense will be executed again by returning to Step 211.

If the key input is not executed, the present data and time are displayed (Step 218). Then, the displayed present date is compared with alarm time data stored in the alarm time memory 42 (Step 219), and the present date and alarm time data are compared to determine whether they are conformable or not (Step 220). If they are incongruent, the processing returns to Step 211. On the contrary, if they are conformable, the alarm control part 25 will sound the buzzer by driving an alarm generator 43 (Step 221). At the same time, the date and time, and the contents of the schedule data that are set by the alarm (alarm requisition) are displayed (Step 222).

Next, the time of the schedule data and the time of a next schedule data (i.e., after the schedule data in time order) are set into the alarm time memory 42 (Step 223). Then, in addition to calculating and displaying the time difference between both times (Step 224), the time and contents of the next schedule data are displayed (Step 225). Since the pictures of Steps 222, 224 and 225 are displayed on the same display screen, respective elements are displayed at the same time. In this case, an example of the picture plane or display screen is shown in FIG. 9.

Accordingly, when the schedule data set by the alarm is displayed, the contents and time difference between the next piece of schedule data and the original piece of schedule data can be confirmed simultaneously. So, the time to spare, i.e. the time remaining before the schedule event, can be known without using other devices and functions, and therefore the operator is able to use time more effectively.

Further, the next data may be that for which the alarm is set, and the picture plane may be employed to show respective schedule data, and the data and time thereof, displayed partially as a window display on the display screen with the picture plane format A, as shown in FIG. 10.

As hereafter described, the data processing apparatus with schedule control function according to the embodiment may be designed so that the schedule data having the set alarm are displayed in preference to other data during operation, and moreover, when the apparatus is not operated, the schedule data is displayed after the power source of the apparatus is turned on.

Figure 11A:
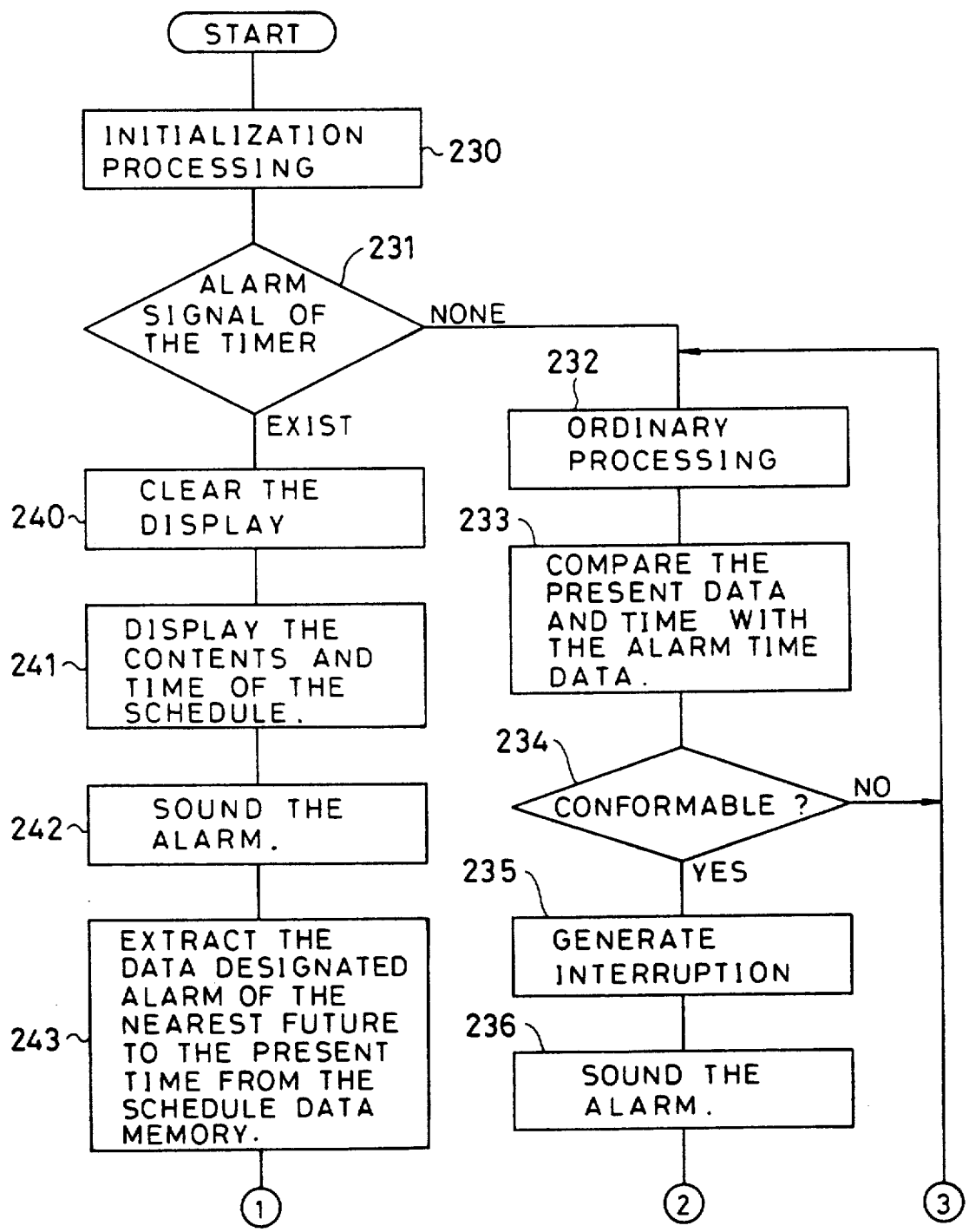
FIGS. 11a and 11b are flowcharts showing a displaying operation of schedule data necessary to be annunciated in preference to others according to an embodiment.
Figure 11B:
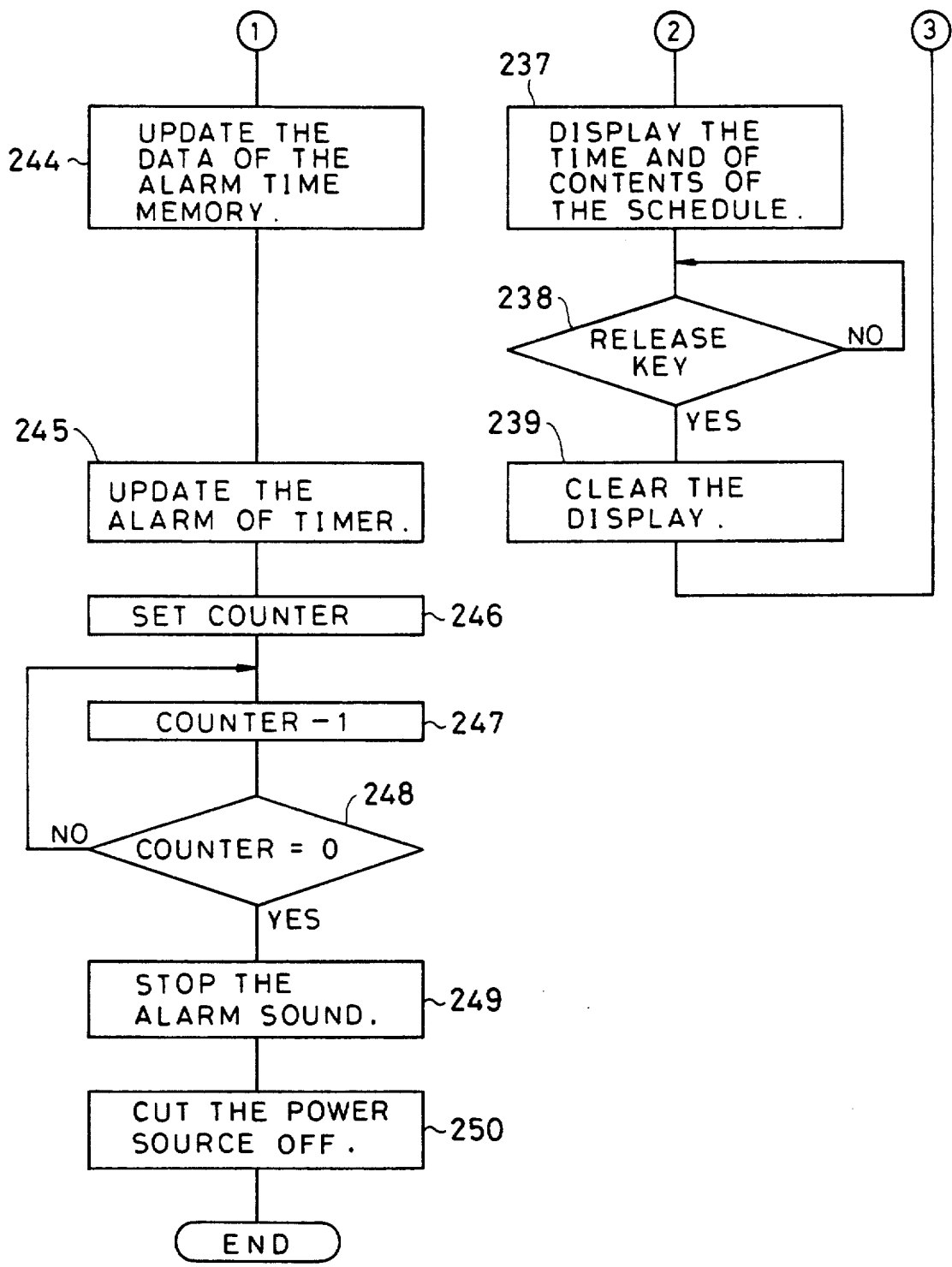

Namely, as illustrated in FIGS. 11a and 11b, after the power source is turned on either by a power source switch or a signal of the timer 28, the initial conditions for each memory and the display part 26 and the like are set by the initialization processing (Step 230). Then, in order to check that the power source is turned on either by the power source switch or an alarm signal outputted from the timer 28, the timer 28 is checked to determine whether the alarm signal exists or not (Step 231). If the alarm signal does not exist, a decision is made that the power source was turned on by the power source switch, and then, ordinary processing such as text input, schedule input and others will be executed (Step 232). During ordinary processing, where a key input is not executed, the present date and time are compared with the alarm time data (Step 233). If they are conformable (Step 234), an interruption processing signal is generated (Step 235). If they are incongruent, the processing returns to Step 232. When the interruption processing signal is generated, ordinary processing is suspended for a period of time, and the alarm control part 25 drives the alarm generator 43 to sound the buzzer (Step 236). Thereafter, as shown in FIG. 12, the time scheduled, and the contents and reason (memo) are displayed in the window (Step 237). In this condition, if a function key (not illustrated in the drawing) which means "Release" of the key input part 20 is depressed (Step 238), the display screen treated by Step 237 is cleared (Step 239) and the processing returns to Step 232.

If it is determined that the alarm signal exists at Step 231, the display is first cleared (Step 240), and then the time and contents of the schedule and the reason are displayed (Step 241). At the same time, the alarm generator 43 is engaged to sound the buzzer (Step 242). Thereafter, the schedule data memory 31 is retrieved and schedule data which is set for the alarm time in the nearest future from the present time is extracted from the schedule data memory 31 (Step 243). Then, the contents of the alarm time memory 42 is updated (Step 244), and furthermore, the alarm time data stored in the timer 28 is updated (Step 245). Thereafter, in order to stop the sound of the alarm after the predetermined time has passed, a counter for an alarm control part 25 is set (Step 246) and decreased (Step 247), and the alarm sound is stopped when the counter becomes zero (Steps 248 and 249). After these processing are finished, the power source is turned off automatically (Step 250).

Accordingly, in spite of the operating conditions and whether the power source is turned on or off, the scheduled matter is presented and the contents of the corresponding schedule data and others are displayed when the set date and time come to the present date and time. Therefore, the operator can easily grasp the time for which items have is scheduled. Since the alarm is generated even while the power source is turned off, it is unnecessary to leave the power source turned on. So, the apparatus can be used economically from the view of minimizing power consumption.

Figure 13A:
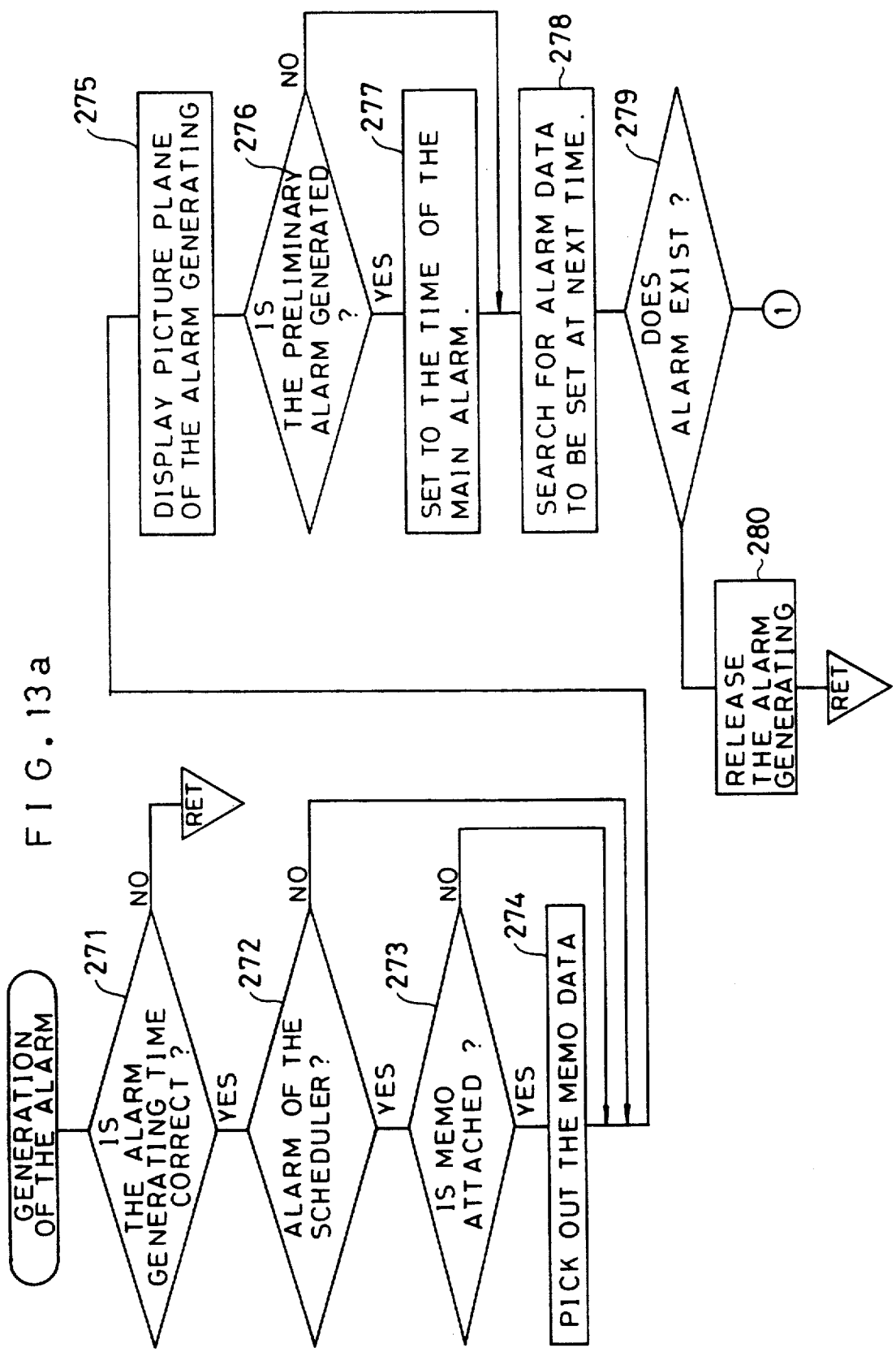
FIGS. 13a and 13b are flowcharts showing an operation respectively displaying schedule data necessary to be annunciated at the preliminary alarm time and the alarm time respectively set.
Figure 13B:
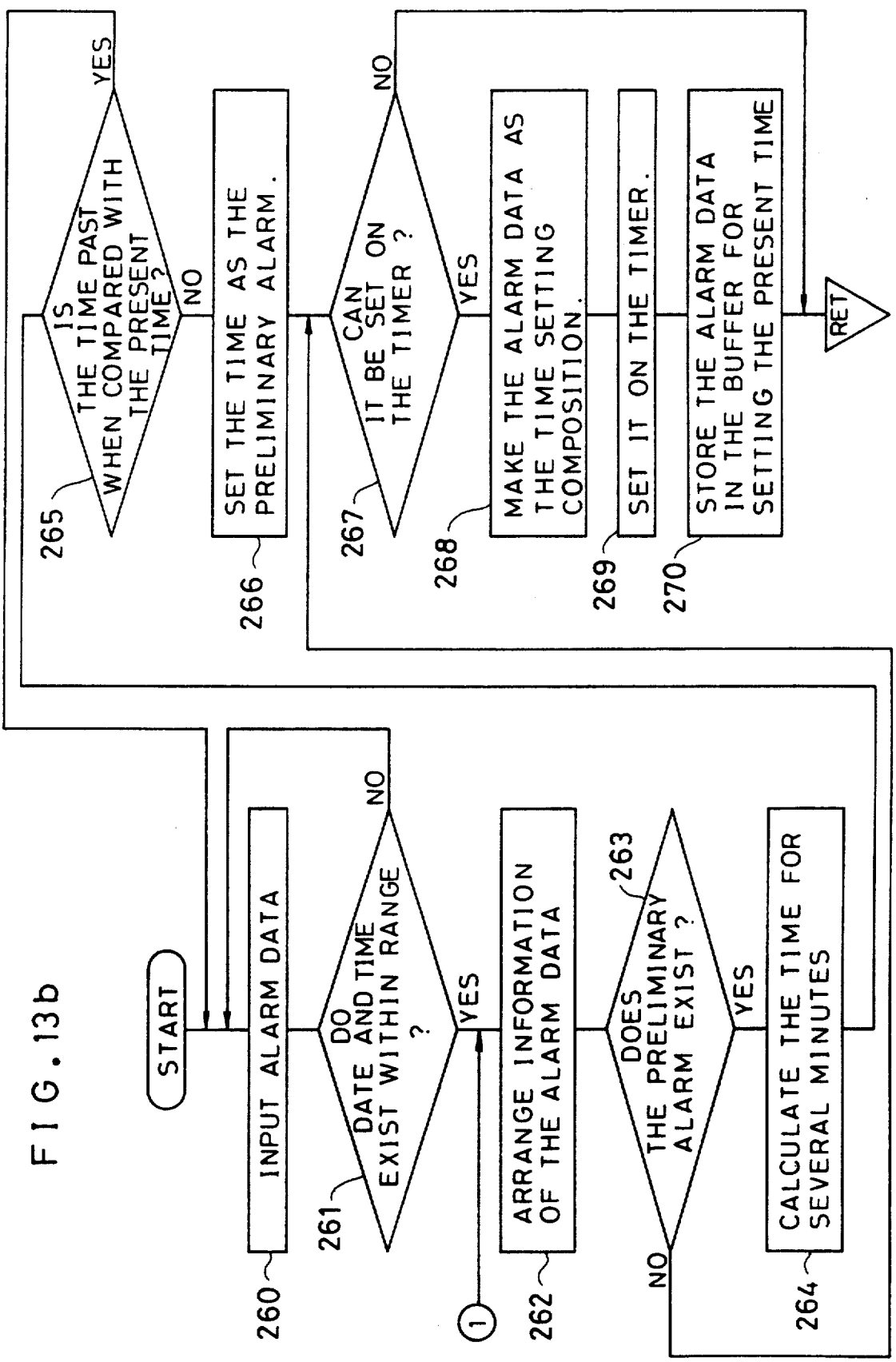

Next, the operation of the preliminary alarm is shown in FIGS. 13a and 13b.

In FIGS. 13a and 13b, when an alarm is set via input through the key input part 20 (Step 260), the input is analyzed by the main control part 21 and then transferred to the schedule control part 23 as an item of data. The schedule control part 23 determines whether the date and time of the transferred data is after or before the present data and time, that is, whether the date and time of the transferred data exists within the range capable of being setting or not (Step 261) and if the data is unsuitable, it is treated as erroneous. If the data exists within the range, the alarm data is arranged and the information data about the type of generated alarm are set as a unit of data by the main control part 21 (Step 262). In this instance, the decision whether the preliminary alarm is to be set several minutes before (effective or ineffective) is executed by the schedule control part 23 (Step 263). If the result is effective, the time which is a predetermined time (about five minutes) before the time of the inputted date and time is calculated (Step 264). Then, the present time outputted from the timer 28 is compared with the calculated time to judge whether the calculated time is past or not against the present time (Step 265). If the calculated time is not past, the data of the time is transferred through the main control part 21 to the alarm control part 25 in order to set a preliminary alarm time data entry (Step 266). The preliminary alarm time data entry is compared with other data stored in the alarm time memory 42 by the alarm control part 25 to check whether the preliminary alarm time data entry is in nearest future from the present time or not and to judge whether the preliminary alarm time data can be set in the timer 28 or not (Step 267). If it is possible to set the preliminary alarm time data, the preliminary alarm time data entry is made as a structure for setting the timer 28 (Step 268) and is also set into the timer 28 through the main control part 21 (Step 269). Simultaneously, the preliminary alarm time data is saved in the buffer for setting the present time in the alarm time memory 42 (Step 270).

Regarding the generation of an alarm, the alarm generating time is first judged to determine whether the time is correct or not (Step 271). If it is correct, the time is judged to determine whether it is a scheduled alarm of the aforesaid alarm data set with a requisition of alarm and the preliminary alarm time data or only a simple alarm data which is set at another time to sound the buzzer when the set time arrives (Step 272). In the instance where it is a scheduled alarm, a decision is made to determined if there is a memo data entry associated with (Step 273). If there is a memo data entry, the memo data is picked out (Step 274) and displayed in the window of the display part 26 together with the date and time, and the contents of the schedule data (Step 275). In this instance, the alarm generator 43 is simultaneously actuated to sound the buzzer. In the next place, the generated alarm is viewed to determine whether it is the preliminary alarm or not (Step 276). If it is the preliminary alarm, the alarm time data of an original alarm is set for the original alarm generation (Step 277). Thereafter, the retrieval for alarm data set at the next time is executed (Step 278) to determine whether the alarm data exists or not (Step 279). When the alarm data exists, the processing returns to Step 262. Where the alarm data does not exist, the alarm generation is released (Step 280).

Accordingly, by generating the preliminary alarm before the original alarm generating time, it becomes possible to prepare for one's schedule, set the alarm, and prevent the person from being tardy.

Further, where the preliminary alarm time data is effectively set in the timer 28, if the preliminary alarm data is changed to be ineffective, the data is deleted at this point of time and the aforesaid series of operations are repeated on the assumption that new data will be inputted by changing to actual time data.

Next, the operation for designating a day of week to generate the alarm will be explained as shown in to FIG. 14 to FIG. 17.

Figure 14:
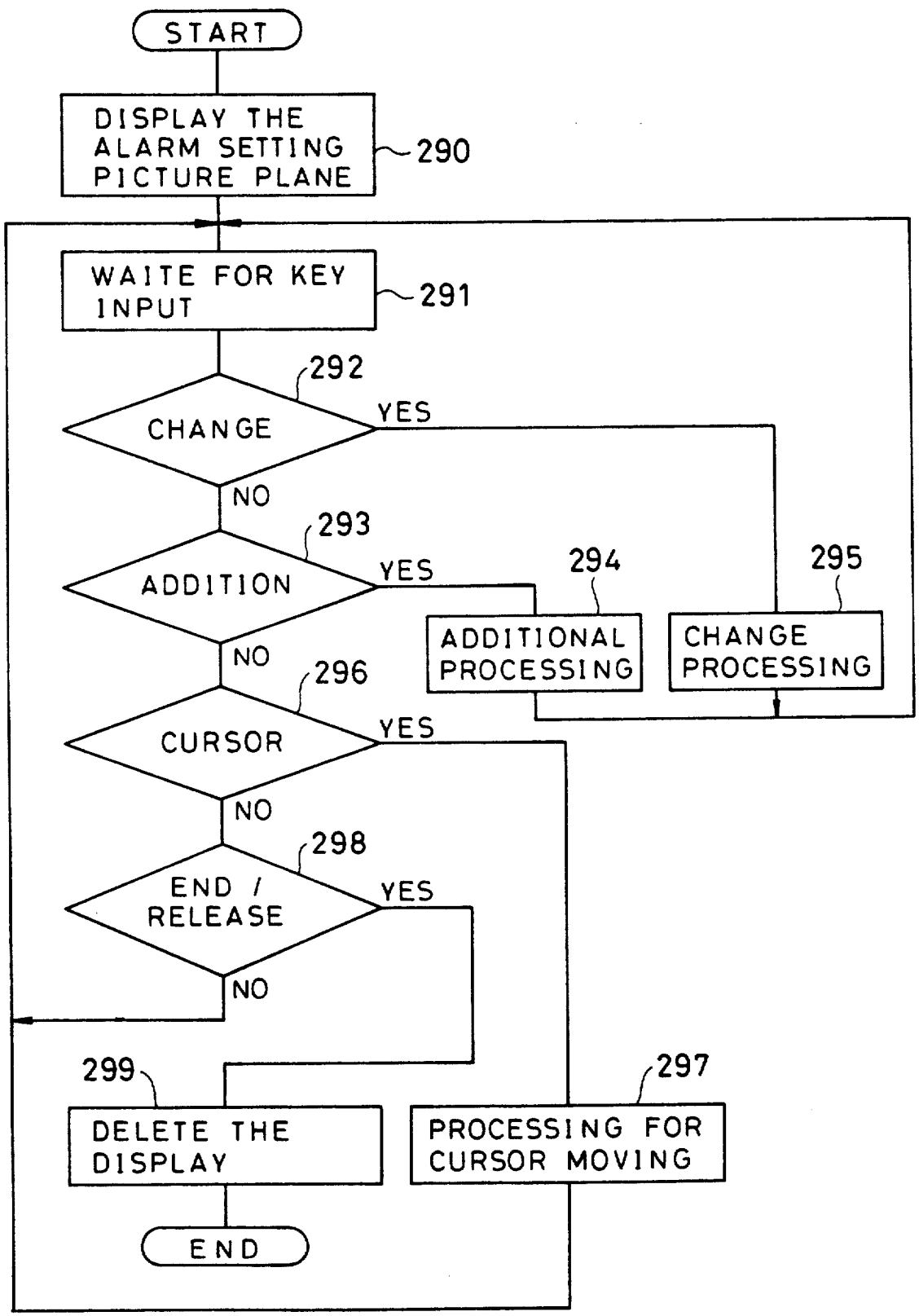
Figure 15:
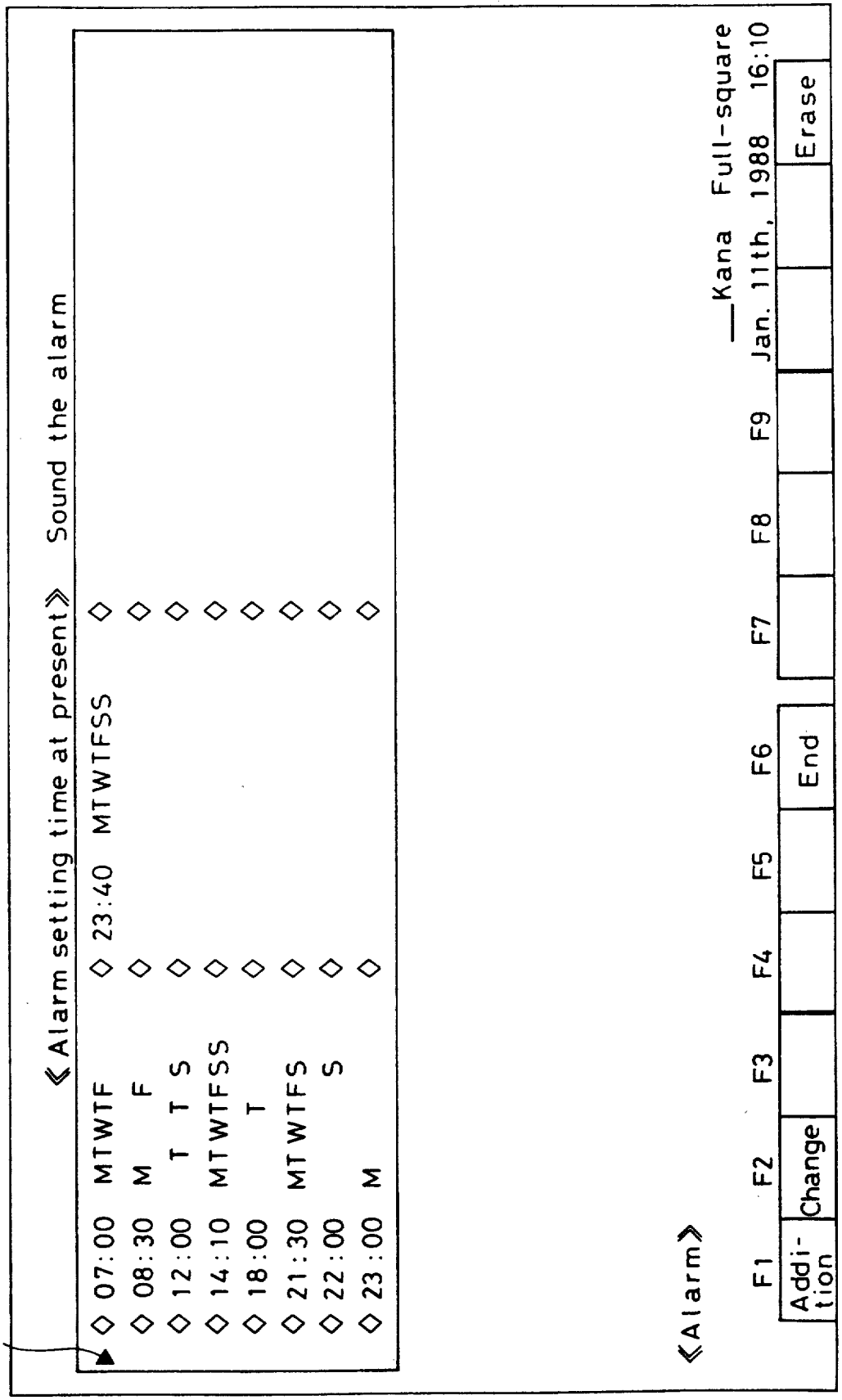
FIG. 15 is a diagram showing a configuration of a display screen in an alarm setting mode for day of the week.

In FIG. 14, in order to enter into the alarm setting mode, when the key input part 20 is first operated on the initial picture plane, the alarm setting picture plane is displayed (Step 290). Under these conditions, the system waits for a key input from the key input part 20 (Step 291). At the time, on the display screen, the alarm time and day-of-week which are set at present time are displayed with a picture plane or screen (or window) as shown in FIG. 15. In the alarm setting mode, adding, changing and erasing can be executed, and new settings can be entered. When the function keys (for changing and deleting) are depressed (Steps 292 and 293), processing for changing or deleting can be executed respectively (Steps 294 and 295).

When the cursor moving keys are depressed on the key input part 20 in order to adequately move the cursor 50 on the display screen (Step 296), the cursor moving processor is executed and the cursor 50 is moved to the desired position (Step 297). Also, when the function keys for end or release are depressed (Step 298), the processing for deleting the displayed picture plane is executed (Step 299).

In the next place, when the alarm is actually set, the required modes are respectively selected in order to execute the above adding processing as mentioned in Step 294 and changing processing in Step 295.

When the changing mode is selected, the processing will be explained below. In FIG. 16, the alarm data located in the cursor position is first picked out (Step 300). Here, if there is data (Step 301), the picture plane is changed for data inputting (Step 302). As shown in FIG. 17, for a display screen for changing, the areas for time designation and day-of-week designation are set in the window. When the cursor is moved within the window, the position of the cursor is judged to determined whether it is placed in the time designation area or day-of-week designation area (Step 303). If the cursor is placed in the time designation area, only in the case when a correct time is inputted, the time can be set (Step 304). Thereafter, the state is checked to determine whether it is "end" or not (Step 305). If it is "end", the changing mode will be released.

In the case of Step 303, if the cursor is placed in the day-of-week designation area, the system await key inputting (Step 306). The day-of-week designation is executed by respective keys on the key input part 20. Namely, on the key input part 20, there are seven function keys to individually designate each day of the week from Monday to Sunday, a function key to collectively designate five days of the week from Monday to Friday, a function key to collectively designate Saturday and Sunday, and furthermore, a function key to designate every day.

The next stage is a determination of which function key is depressed (Step 307). If any function key is depressed, the day-of-week processing is executed corresponding to the function of the depressed function key (Step 308). For example, if the function key set for Wednesday is depressed where "Monday, Friday and Saturday" are already set, the setting state is changed to "Monday, Wednesday, Friday and Saturday", and then, "Sun, Wed, Fri and Sat" are displayed in the day-of-week designation area. Also, if the function key set for "Monday to Friday" is depressed where "Monday, Tuesday, Saturday and Sunday" are already set, the setting state is changed to "Monday to Saturday", and then, "Mon, Tue, Wed, Thu, Fri and Sat" are displayed in the day-of-week designation area.

After the inputting of the day of the week is completed according to the processing as described above, if the execute key is depressed without moving the cursor 50 (Steps 309 and 310), the alarm setting processing (alarm handler) is executed (Step 311). If the release key is depressed without depressing the execute key (Step 312), the changing mode is finished without setting. If it is determined that the cursor 50 is moved at Step 309, the cursor moving processing is executed (Step 313), and cursor position is determined after returning to Step 303.

Among the function keys, there is a function key for setting the function to delete all the days of the week that where set (deleting for day-of-week). When the function key is depressed, all the days of the week that were set are collectively and simultaneously deleted. Also, where a designated day of the week is to be deleted, the day can be deleted by depressing the function key which is set for that day of week desired to be deleted.

By designating the day of the week as mentioned above, an alarm setting corresponding to the purpose for generating that alarm can be achieved.

After setting the alarm corresponding to importance (rank) of the contents of the schedule data or type of contents (such as company business and private use), various types of alarm are generated by changing the tone, sound length, volume and rhythm corresponding to the setting. Hereinafter, the operation for generating the various types of alarm will be described according to FIG. 18.

In FIG. 18, where an alarm is set for schedule data, a processing of alarm generating judgment is executed after checking if the alarm time is conformable (Step 320). If the generation of alarm is judged (Step 321), the generation of alarm and the time of alarm generation are displayed on the display screen (Step 322). The alarm generated in this point of time is judged to determine whether it is a scheduler alarm or a weekly alarm designated with a day of the week (Step 323). In the case of scheduler alarm, the existence of message accompanying the scheduled alarm is locked (Step 324). If a message exists, the message is displayed in the window of the display screen (Step 325). Where a weekly alarm without a message and after the message of Step 325 is displayed, whether the alarm sound is given or not is determined since the requisition of the alarm sound has been set (Step 326).

Where an alarm has been set, a type of alarm sound is classified (Step 327). When the alarm is set, the importance of the schedule data are to be entered. For example, "most important, important and ordinary" can be classified. The words of the classification are associated with symbols and are also set so the words can displayed. By correspondence with the classification of importance, types of the alarm sound are respectively selected. Apart from these, the classification may be set according to an attribute of schedule data such as "Schedule 1, Schedule 2 and Schedule 3".

Regarding the sound of the alarm, all the sounds of the buzzer are varied by changing a musical interval (high- and low-pitched sounds), a continuously generated length of the buzzer sound, and interval between shots of buzzer and others. For example, by combining the three elements abovementioned, a multiplicity of types of alarm sound can be made. And, after Step 327 is executed, the alarm sound is generated (Step 328). High-pitched sound is especially recommended for most important schedule data so that the generated sound can be recognized by the operator. Also, in the case of classification by an attribute of schedule data, the classification may be done by changing an interval and rhythm of the alarm sound.

In such a manner, the tone quality of the alarm can be changed according to an operator's intention about types of contents of Schedule data, such as importance of the schedule data, kinds of company business and private use, purpose and place of schedule. Accordingly, when the alarm sounds, the cause of the alarm can be grasped without viewing the display screen, so, the schedule can be controlled more smoothly and quickly.

What is claimed is:

1. A data processing apparatus having schedule creation, prioritization, display and control functions and a plurality of operating states, comprising:

key input means for inputting schedule data and various designations for said schedule data;

display means for displaying various data including said schedule data;

schedule data memory means for storing schedule data inputted via said key input means, said schedule data memory means further storing schedule data in association with a particular date and a particular time;

time calculation means for calculating and outputting a present date and time;

alarm setting means for setting an alarm date and an alarm time in association with at least a portion of said schedule data for the ringing of an alarm and displaying of said associated schedule data, and for directing the storage of said alarm date and alarm time with said associated schedule data in said schedule data memory means;

first comparison means for comparing said present date and time outputted from said time calculation means with said alarm date and time set with said associated schedule data and for generating a conformation signal when said present date and time conforms to said alarm date and time set with said associated schedule data;

first display control means for causing said display means to simultaneously display both said schedule data associated with said alarm date and time and other schedule data that is stored in adjacent relation with respect to date and time to said associated schedule data in response to a generation of said conformation signal by said first comparison means, said first display control means further comprising means for causing said display means to display both said adjacent and said associated schedule data with priority over all other schedule data without regard to all data then currently displayed by said display means and a then current operating state of said apparatus:

second display control means for causing said display means to display said schedule data associated with said alarm date and time on said display means after a power source of said apparatus is turned on from an unused state when said first comparison means generates a conformation signal based on conformation of said alarm date and time with a present date and time which occurred prior to said turning on of the power source; and alarm means for announcing that said schedule data associated with said alarm date and time is displayed on said display means.

2. The data processing apparatus according to claim 1, which further comprises:

preliminary time setting means for calculating a preliminary alarm date and time at a predetermined date and time before said alarm date and time, and for setting said preliminary alarm date and time in association with a preliminary alarm schedule data;

second comparison means for comparing said present date and time outputted by said date and time calculation means with the date and time set by said preliminary time setting means and for generating a second conformation signal when said present date and time conforms to said preliminary alarm date and time set with said associated schedule data reason memory means for storing a reason for which the alarm date and time is set in association with said preliminary alarm schedule data inputted from said key input means;

third display control means for simultaneously causing said display means to display said preliminary alarm schedule data and the reason stored in said reason memory means corresponding therewith on said display means in response to a generation of said second conformation signal by said second comparison means; and second alarm means for announcing that said schedule data associated with said preliminary alarm date and time is displayed on the display means and for announcing that the schedule data associated with said alarm date and time is displayed on said display means.

* * * * *